United States Patent
Wu (12)

(10) Patent No.: US 6,184,653 B1
(45) Date of Patent: Feb. 6, 2001

(54) MULTI-OUTPUT MODE CHARGER

(75) Inventor: Hsin-Hong Wu, Chung Ho (TW)

(73) Assignee: Long Sail Electronic Co., Ltd., Taipei Hsien (TW)

( * ) Notice: Under 35 U.S.C. 154(b), the term of this patent shall be extended for 0 days.

(21) Appl. No.: 09/556,708

(22) Filed: Apr. 24, 2000

(30) Foreign Application Priority Data

Jun. 29, 1999 (TW) ............................................. 088210748

(51) Int. Cl.$^7$ .................................................. H01M 10/46
(52) U.S. Cl. ............................................................ 320/110
(58) Field of Search .................................... 320/106, 110, 320/125, 128, 160, 162, 163, 164

(56) References Cited

U.S. PATENT DOCUMENTS 4,443,752 * 4/1984 Newman .

* cited by examiner

Primary Examiner—Edward H. Tso

(57) ABSTRACT

A multi-mode output charger is to support different kinds of batteries for the mobile telecommunication facility. It comprises a charger and a charge unit. Users can choose different charging voltages and charging currents with a voltage and current regulating switch of the charger. Therefore, the charger can support different voltage and current combinations for batteries. And the charge unit has several kinds of charge connecting set for different brand batteries. Also, the charge unit can extend to engage with different mode charge connecting set for enlarging its supporting range.

18 Claims, 4 Drawing Sheets

MULTI-OUTPUT MODE CHARGER

FIELD OF THE INVENTION

The present invention relates to a multi-output mode charger, and more specifically to support different kinds of batteries for multi-model mobile telecommunication facility and provide different charging voltage and currents with a voltage and current regulating switch.

BACKGROUND OF THE INVENTION

Mobile telecommunication facility has become an indispensable part of our daily life that different kinds of its application are widespread used for indoor and outdoor activities, vehicles, and mountain areas. However, its durability and functionality are limited by its battery capacity. In fact the battery has-become a key point among those limitations.

Charging is a necessary process for mobile telecommunication facilities. For example, every family member has his own wired or non-wired equipments. However, batteries with different models and brands have different charging way of their own voltage and current requirements. This is one of the reasons that one is always not enough for a family usage. The result is a lot of money and resources wasted. In addition, these facilities can cause heavy contamination of our environment for their material can not be well decomposed.

To solve these problems, a multi-output mode charger is invented to support different kinds of batteries and power systems of different countries.

SUMMARY OF THE INVENTION

The primary object of the present invention is to provide a multi-output mode charger which may support different kinds of voltage and current requirements. A voltage and current regulating switch which can provide different voltages and currents for different batteries of multi-model and brands in order to avoid the waste of resources and protect the environment.

The other object of the present invention is to provide a multi-output mode charger which employs a high-voltage end switch, a low-voltage end switch and a switch control circuit in its DC (direct current) power charge transformer section. That can reduce the weight and dimensions of the charger and makes this invention be portable.

The further object of the present invention is to provide a multi-output mode charger, which can support different kinds of charge connect set. Therefore, it can be applied to different kinds of batteries for multi-model and brands.

The further object of the present invention is to provide a multi-output mode charger which has a voltage transforming circuit and a current transforming circuit to sample the voltage and current output of the multi-output mode charger and feedback them to microprocessor. Those give more information for the microprocessor to refine the controlling on the multi-output mode charger, protect the batteries, and enforce the transforming efficiency.

Other features and advantages of the invention will become better understood from the following description of the invention which refers to the accompanying drawings.

DESCRIPTION OF THE PREFERRED EMBODIMENTS

Figure 1:
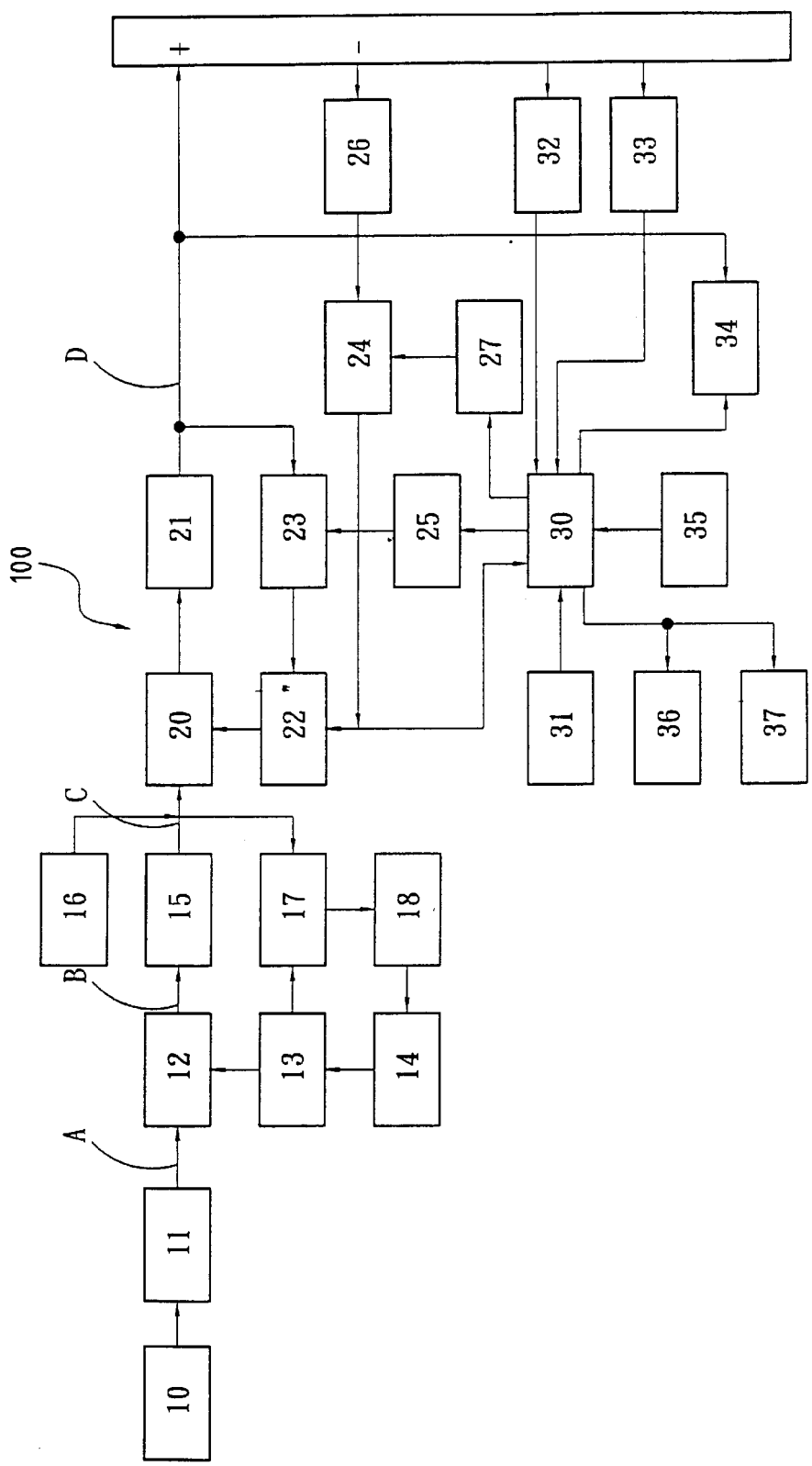
FIG. 1 is a system block circuit diagram of the present invention.

Referring to FIG. 1, which is a system circuit diagram of the present invention. The charger 100 has an adopter 10 which is designed to support any kind of indoor power system, 85V~265V. And a high-voltage rectifying circuit 11 rectifies the indoor power to DC high voltage output A that is wired to the primary end of a high-frequency transformer 12. The other end, secondary end, connects to a high-voltage end switch 13 which comprises bipolar transistors and gates., and "ON" and "OFF" for the high-voltage end switch 13 is controlled by a high-voltage end switch control circuit 14 with high frequency. The secondary end of the high-frequency transformer 12 outputs an AC (alternating current) low voltage power and connects to a low-voltage rectifying circuit 15. The low-voltage rectifying circuit 15 outputs a DC voltage C in a specific tolerances, 12V~14V.

The output of the low-voltage rectifying circuit 15 connects to a DC input socket 16. The DC input socket 16 is designed to support many kinds of cigar-lighters of cars. The DC input socket 16 is only used in car, so it is impossible to have the DC input socket 16's output and the DC voltage C at the same time. The DC voltage C or the output of the DC input socket 16 connects to a voltage detecting circuit 17 which detects the DC voltage C (or the DC input socket 16's output) whether it locates in the specific tolerance (12V~14V). And the voltage detecting circuit 17 controls a photo coupler 18 to drive the high-voltage end switch control circuit 14. Then, the high-voltage end switch control circuit 14 can regulate the "ON" and "OFF" cycle of high-voltage end switch 13. The DC voltage C can be hold in the specific tolerance.

The DC voltage C as the output of the low-voltage rectifying circuit 15 or the output of the DC input socket 16 are further connected to a low-voltage end switch 20. The low-voltage end switch 20 comprises bipolar transistors and gates that can work in low-voltage switch state. The output connects to a filtering and anti-inversing charging circuit 21. The filtering and anti-inversing charging circuit 21 outputs a normal power D to charge unit 200. A low-voltage switch control circuit 22 with high frequency controls the low-voltage end switch 20. A voltage comparator 23 and a current comparator 24 control the low-voltage switch control circuit 22 to decide the low-voltage end switch 20's "ON" and "OFF" cycle. Therefore, a constant voltage output D is produced and lots of current selections can be chosen.

The voltage comparator 23, which compares a output of the filtering and anti-inversing charging circuit 21 with that of a first reference voltage circuit 25, outputs a control signal with high frequency. The control signal is to dominate the low-voltage switch control circuit 22 and regulates the "ON" and "OFF" cycle. This can finest maintain a constant voltage output D.

The current comparator 24 compares a output of a current detecting circuit 26 with that of a second reference voltage circuit 27 to output a control signal. The signal controls the low-voltage switch control circuit 22 with high frequency and regulates the "ON" and "OFF" cycle. This approaches the finest control for the low-voltage switch control circuit 22. Because the detecting circuit 26 directly detects and feeds back the current of the charge connect set 210 of the charge unit 200. This will refine the charge current control.

A microprocessor 30 is the control center of the charger 100. The microprocessor 30 receives a control signal or numeric value from a voltage and current regulating switch 31. According to the signal or numeric value, the microprocessor 30 sets the voltage and current for the charge connect set 210 of the charge unit 200. The microprocessor 30 can output a normal charge current and voltage for the charged battery, and controls the first reference voltage circuit 25 to output a reference voltage for the voltage comparator 23. And, the microprocessor 30 controls the second reference voltage circuit 27 to output a reference current for the current comparator 24. The reference current is the reference to compare with the feed back current from the detecting circuit 26.

The microprocessor 30 also recieves a charging voltage fed back from the charge connect set 210 of the charge unit 200, since a voltage transforming circuit 32 and a current transforming circuit 33 sample charging voltages and charging currents from the charge connect set 210 and transform them to be reference signals or numeric values which are input to the microprocessor 30 in order to control charging voltage and charging current and protect batteries thereof.

The microprocessor 30 also controls a discharge circuit 34. It can identify whether a charged battery is a Ni—H or Ni—Cd battery. If the charged battery is a Ni—H or Ni—Cd battery, discharge circuit 34 will be triggered by the microprocessor 30 to eliminate the memory effect. Users also can push a discharge button 35 to trigger the same step. That can always keep the Ni—H or Ni—Cd battery in good conditions.

The microprocessor 30 can also display the charging and discharging states by a display unit 36. And the display unit 36 can be emitting diodes, emitting diode array or LCD (liquid crystal display) to express the charging and discharging.

The microprocessor 30 also controls a buzzer 37 which launches different tones or sounds for different charging or discharging states. Therefore, users can identify the states without seeing the display unit 36.

Figure 2:
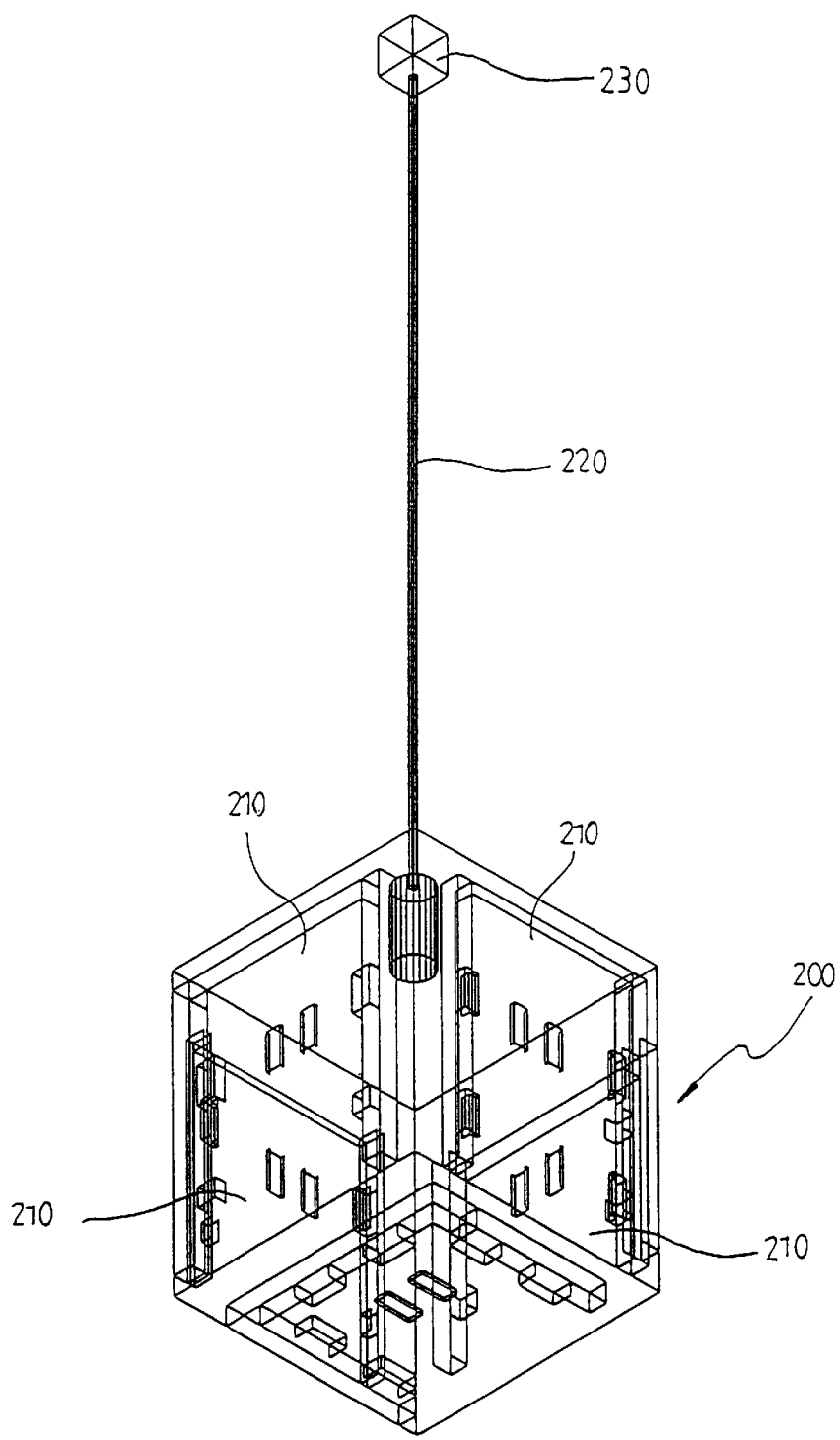
FIG. 2 is a perspective view of the charge unit of the present invention.
Figure 3:
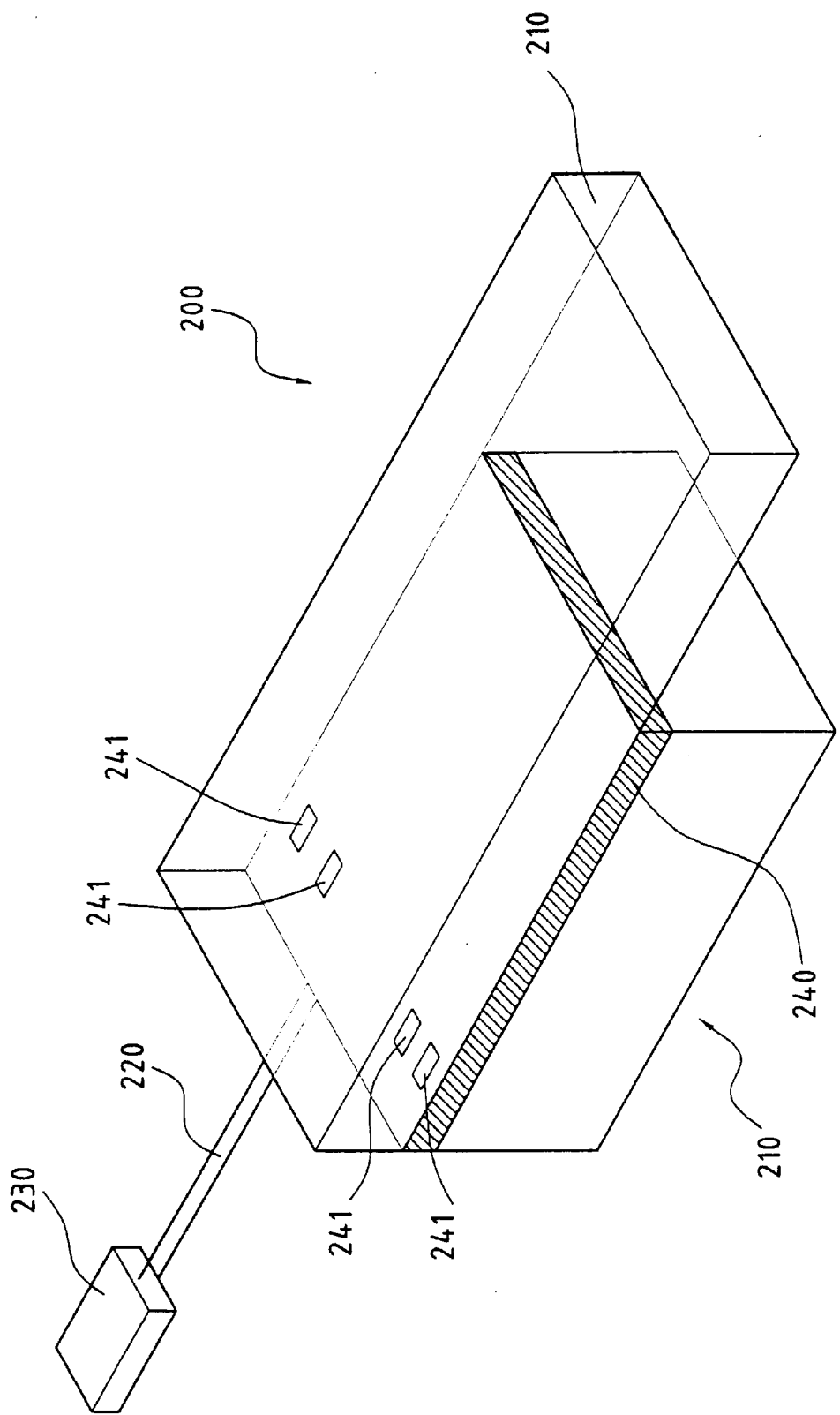
FIG. 3 is an embodiment of the charge unit of the present invention.

Referring to FIG. 2, the multi-output mode charge of present invention further includes a charge unit 200 which has lots of different charge connect set 210. The charge connect set 210 can support lots kinds of brands and models of telecommunication batteries. Also, the charge connect set 210 is wired to the output of the charger 100 with a connect line 220 and a connector 230. Then, the charger 100 outputs a charge power for the charged battery. Referring to FIG. 3, it is another embodiment of the present invention of charge unit 200 which has a base 240. The base 240 connects to the output of the charger 100 by the connect line 220 and the connector 230. And, several connect ends 241 are set on the base 240 which can support many kinds of brands and models of charge connect set 210. Therefore, users can use this facility flexibly and expand the connection.

Figure 4:
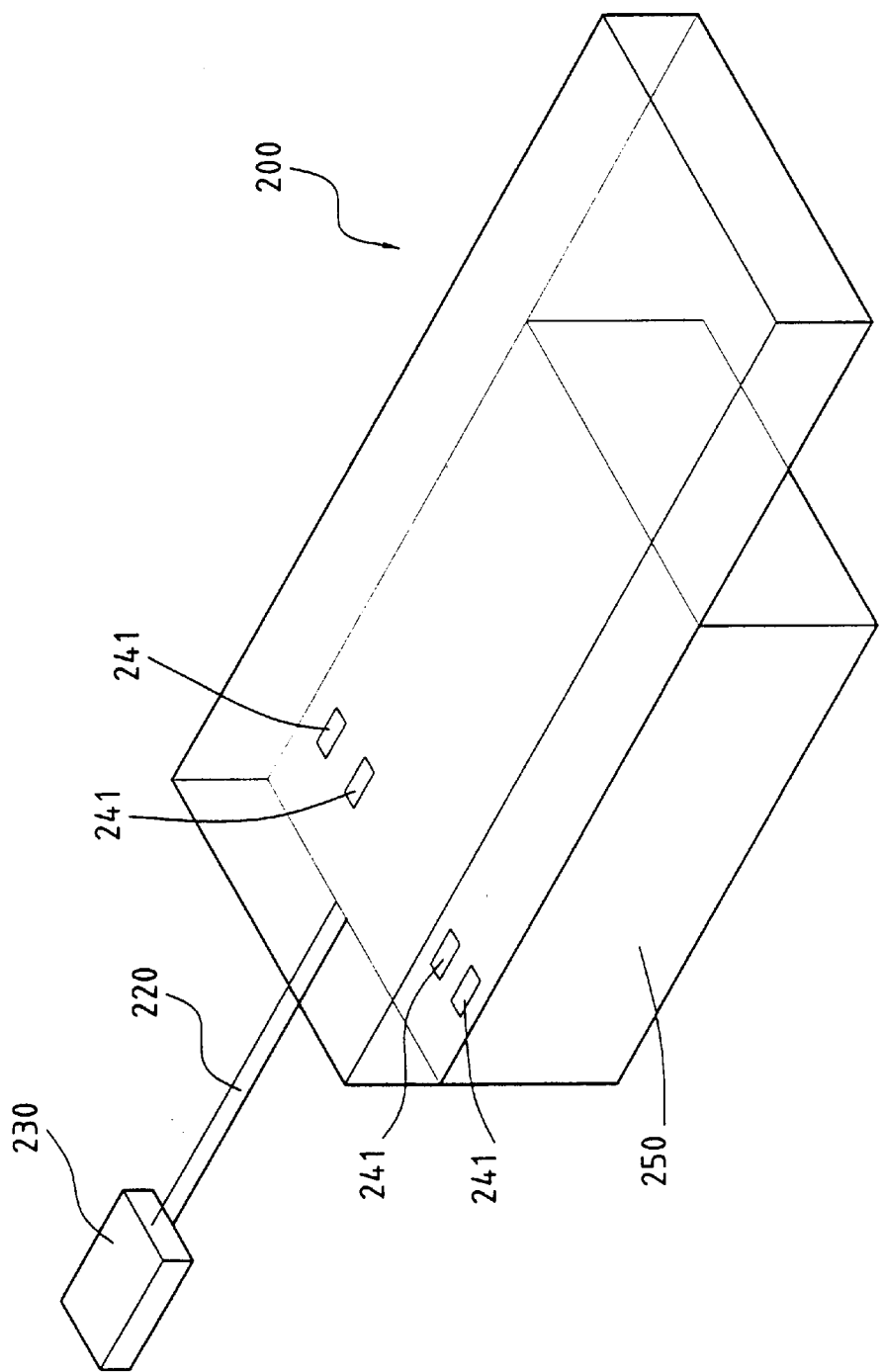
FIG. 4 is another embodiment of the charge unit of the present invention.

Referring to FIG. 4, it is another embodiment of the present invention of charge unit 200. The difference between this embodiment and the embodiment shown in FIG. 3 is that the charge connect box 250 has a base 240 inside it (not shown in FIG. 4). The charge connect box can collect any brands or models of charge connect set 210. That will be more convenient for users to collect and access them.

Although this invention has been described with a certain degree of particularity, it should be understood that the present disclosure has been made by the way of the preferred embodiment only and that numerous changes in the detailed construction and combination as well as arrangement of parts may be restored to without departing from the spirit or scope of the invention as hereinafter set forth.

What is claimed is:

1. A multi-mode output charger, comprising a charger and a charge unit, a circuit structure of said charger further comprising:

a. a high-voltage rectifying circuit for transforming the indoor system power to a high-voltage direct current output;

b. a high-frequency transformer whose primary end is wired to said high-voltage rectifying circuit output for loading said high-voltage direct current output outputting a low-voltage high-frequency alternating current power in the secondary end;

c. a high-voltage end switch and a high-voltage end switch control circuit, said switch is wired to said high-frequency transformer and its "ON" and "OFF" is controlled by said control circuit with high frequency, therefore, said high-frequency transformer's secondary end outputs a low-voltage high-frequency alternating current power;

d. a low-voltage rectifying circuit wired to the secondary end of said high-frequency transformer for outputting a direct current voltage in some specific tolerances;

e. a voltage detecting circuit and a photo coupler, said voltage detecting circuit is to monitor whether the direct current output of said low-voltage rectifying circuit locates into the specific tolerances and control said photo coupler to drive and control said high-voltage end switch control circuit for regulating the "ON" and "OFF" cycle of said high-voltage end switch;

f. a low-voltage end switch, and a filtering and anti-inversing charging circuit, said low-voltage end switch's input end is wired to the direct current output of said low-voltage rectifying circuit and the its output is wired to said filtering and anti-inversing charging circuit for outputting a normal voltage for charging;

g. a low-voltage switch control circuit for controlling "ON" or "OFF" of said low-voltage end switch;

h. a voltage comparator and a current comparator for sending a control signal to said low-voltage end switch control circuit, therefore, the circuit decides the "ON" and "OFF" cycle of said low-voltage end switch;

i. a first reference voltage circuit outputting a voltage for comparing said voltage with a output voltage of said filtering and anti-inversing charging circuit and sending a control signal with high frequency to regulating the "ON" and "OFF" cycle of said low-voltage end switch;

j. a second reference voltage circuit and a current detecting circuit, said current detecting circuit feeds back the real current output of charging and outputs said feed back current to said current comparator comparing said feed back current with a output of said second reference voltage circuit to output a control signal to control said low-end voltage switch control circuit with high frequence and regulate the "ON" and "OFF" cycle;

k. a microprocessor and a voltage and current regulating switch, said microprocessor decides the output voltage and current of charging according to the control signal from said voltage and current regulating switch, and selection of said voltage and current regulating switch controls said first reference voltage circuit and said second reference voltage circuit to output a corresponding reference voltage being the base of said voltage comparator and current comparator comparing with a charging voltage and a charging current; and l. a voltage transforming circuit and a current transforming circuit which sample the charging voltage and current and transforms them to be the references for said microprocessor;

wherein, said charge unit has a multi-mode charge connect set for holding batteries and connecting output voltage of said charger for charging batteries.

2. The multi-mode output charger as claimed in claim 1, wherein said multi-mode output charger is wired to an adapter for connecting the indoor power system.

3. The multi-mode output charger as claimed in claim 1, wherein said high-voltage end switch comprises high frequency bipolar transistors and gates.

4. The multi-mode output charger as claimed in claim 1, wherein said low-voltage end switch comprises high frequency bipolar transistors and gates.

5. The multi-mode output charger as claimed in claim 1, wherein said output of the low-voltage rectifying circuit is wired to a direct current input socket for engaging with an external direct current power.

6. The multi-mode output charger as claimed in claim 5, wherein said direct current input socket engages with the vehicle direct current power system.

7. The multi-mode output charger as claimed in claim 1, wherein said multi-mode output charger further comprises a discharging circuit which is driven by said microprocessor, therefore, the battery on the charge unit can be discharged.

8. The multi-mode output charger as claimed in claim 7, wherein said discharge circuit includes a discharge button for sending a discharge signal to said microprocessor which controls the discharge circuit.

9. The multi-mode output charger as claimed in claim 1, wherein said multi-mode output charger includes a display unit for displaying the charging and discharging states of batteries.

10. The multi-mode output charger as claimed in claim 9, wherein said display unit is an emitting diode array.

11. The multi-mode output charger as claimed in claim 9, wherein said display unit is LCD.

12. The multi-mode output charger as claimed in claim 9, wherein said display unit can display characters and graphics.

13. The multi-mode output charger as claimed in claim 10, wherein said display unit can display characters and graphics.

14. The multi-mode output charger as claimed in claim 11, wherein said display unit can display characters and graphics.

15. The multi-mode output charger as claimed in claim 1, wherein said multi-mode output charger includes a buzzer which is controlled by said microprocessor to launch different tones and sounds for different charging or discharging states.

16. The multi-mode output charger as claimed in claim 1, wherein said charge unit includes a connect line and a connector to link with the charging power.

17. The multi-mode output charger as claimed in claim 1, wherein said charge unit includes a base and several connect end for accepting different kinds of charge connect set.

18. The multi-mode output charger as claimed in claim 15, wherein said charge unit has a charge connecting housing for collecting different kinds of charge connect set.

* * * * *